United States Patent [19]

Lege

[11] 4,138,800
[45] Feb. 13, 1979

[54] DUCK CALL

[76] Inventor: Ricky Lege, Rte. 4, Box 92-D, Abbeville, La. 70510

[21] Appl. No.: 789,286

[22] Filed: Apr. 20, 1977

[51] Int. Cl.² ............................................. A63H 1/28
[52] U.S. Cl. ..................................................... 46/180
[58] Field of Search .................... 46/173, 180; 84/380, 84/383

[56] References Cited

U.S. PATENT DOCUMENTS

| 2,730,836 | 1/1956 | Faulk et al. | 46/180 |
| 3,066,444 | 12/1962 | Dieckmann | 46/180 |
| 3,191,481 | 6/1965 | Miller | 84/380 |

Primary Examiner—Louis G. Mancene
Assistant Examiner—Robert F. Cutting
Attorney, Agent, or Firm—LeBlanc & Shur

[57] ABSTRACT

Disclosed is a bird call particularly adapted for use by hunters in calling ducks. It has a tapered or slanted mouthpiece so that the call may be held in a vertical downward direction with the callers head almost perfectly erect. In this way, the flight of most birds may be watched as the caller is actually using the call. A tongue with a flared groove in the device reduces back pressure and moisture build up in the call.

9 Claims, 16 Drawing Figures

U.S. Patent  Feb. 13, 1979  Sheet 1 of 2  4,138,800
FIG. 1
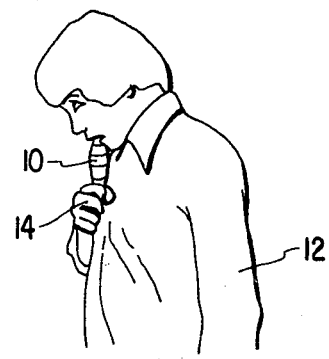
FIG. 2
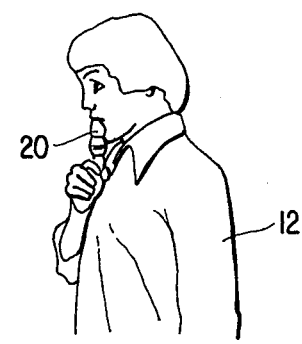
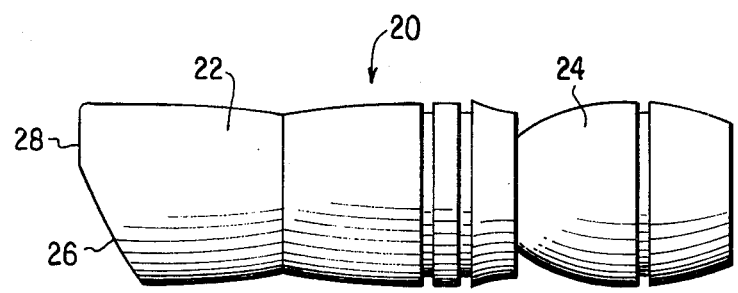
FIG. 3
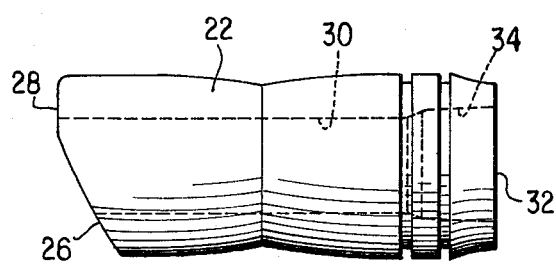
FIG. 4
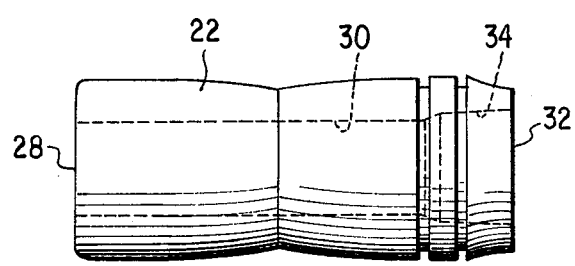
FIG. 5
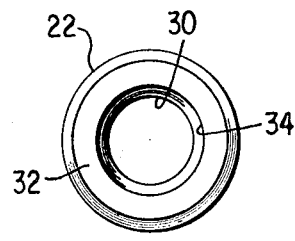
FIG. 6

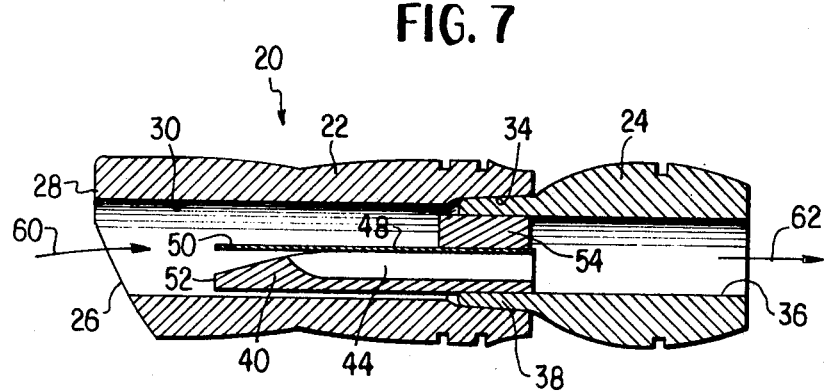
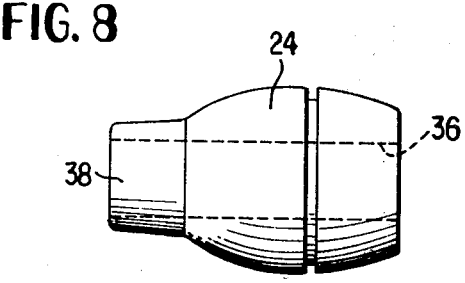
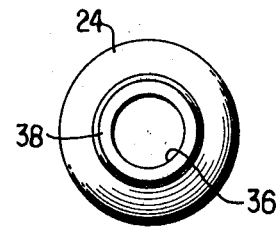
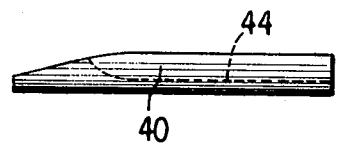
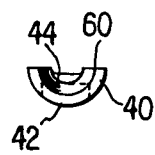
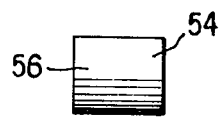
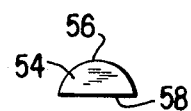
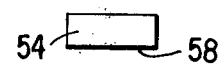
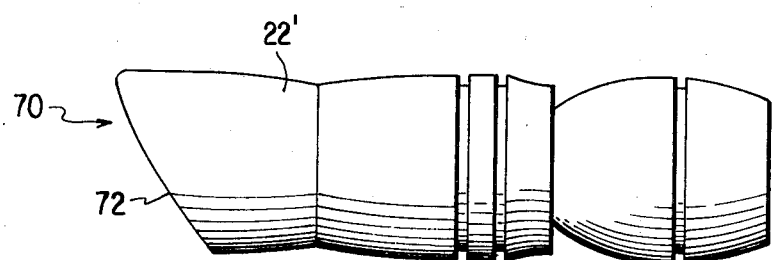

DUCK CALL

BIRD CALL

This invention is directed to a bird call for use by hunters and while usable with geese and the like, is particularly adapted for use as a duck call. Important features of the invention include a slanted mouthpiece and a flared longitudinal groove in the tongue, the former contributing to improved positioning and the latter making it easier to blow.

Devices for imitating the calls of various birds are well known and are used for a variety of purposes, such as hunting, bird watching and the like. Perhaps the most widely used of the bird calling devices are those used for game birds such as wild turkey, ducks and geese. Results vary not only with the type of device used but also with the expertise of the user.

When calling flying game birds such as ducks and geese, it is highly desirable that the sound from the caller project straight downwardly, that is, the end of the device from which the sound emanates should project in a vertical downward direction. This tends to obscure the true source of the sound and gives the impression that the sound is originating from a ground or water surface upon which are usually located decoys to which the flying birds may attribute the sounds of the caller.

Difficulties have been encountered in the past in maintaining conventional bird calls in a vertical position while at the same time watching the flight of the birds overhead. With a conventional bird call, maintaining it in a vertically downward position requires the caller to bend his head forwardly and downwardly so that it is difficult if not impossible to watch and keep track of the flying birds. Observation of the birds during calling is essential so that the calling sounds may be modified in accordance with the action of the birds as they fly over and near the decoys. The tendency at the present time is to lift the head in order to follow the flight of the birds with the result that the call is not in the proper or optimum downwardly directed position.

This problem is overcome with the bird call device of the present invention through the provision of a call with a slanted mouthpiece. In the device of the present invention the mouthpiece is sufficiently slanted so that the bird caller may blow to a substantial extent in a lateral direction as well as downwardly. This ability makes it possible for the caller to hold the bird call in the correct or optimum vertical downward direction while at the same time requiring only a slight bending of the head. In this position, the bird caller is able to look upwardly a sufficient amount to follow the flight of birds in almost any direction except, perhaps, directly above. As a result, the bird caller, in the case of a hunter, can follow the action of the birds as they perhaps circle the decoys and modify the calling sounds in accordance with the observed action of the birds in flight. An additional feature of the invention is the incorporation in the tongue of the bird call of a flared longitudinal groove. By flaring the groove back pressure is reduced making the call easier to blow. This back pressure might otherwise at least partially choke the sound when blown too hard. In addition, the flared groove gets rid of moisture build up from the tongue quicker, so that, the moisture does not adversely affect the tone of the calling sound.

The duck call is constructed from four component parts, in addition to a reed. It can be easily adjusted for optimum tone and anyone who desires can call birds, such as ducks, by simply blowing into the call from the slanted end. The slant end design, in addition to the advantages described above, makes the call easy and comfortable to blow. The tone can be altered by adjusting the reed and also moving the grooved tongue piece in or out of a small cyclinder. It is preferably constructed of a hard wood such as hard hickory so as to be very rugged and durable, but with a thin plastic reed. The thickness of the reed varies the pitch to fit the individual caller's requirements.

It is therefore, one object of the present invention to provide an improved bird call.

Another object of the present invention is to provide an improved call particularly adapted for calling ducks.

Another object of the present invention is to provide a bird call having a slanted mouthpiece.

Another object of the present invention is to provide a bird call having an improved tongue member with a flared groove.

Another object of the present invention is to provide a bird call which makes it possible to keep the call in the optimum vertically downward direction while at the same time the caller's head is sufficiently erect to follow the flight of the birds over nearby decoys.

Another object of the present invention is to provide an improved duck call of relatively simplified and inexpensive construction.

These and further objects and advantages of the invention will be more apparent upon reference to the following specification, claims and appended drawings wherein FIG. 1 is a pictorial view showing the normal head position when using a conventional prior art duck call in the proper vertical position.

FIG. 2 is a pictorial view showing the head position of the caller using the duck call of the present invention with the head in a more erect or upright position.

FIG. 3 is a side view of a duck call constructed in accordance with the present invention showing the tapered mouthpiece.

FIG. 4 is a view of the mouthpiece separate from the soundbox.

FIG. 5 is a side view of the mouthpiece taken at right angles to the view of FIG. 4.

FIG. 6 is an end view of the mouthpiece of FIG. 5.

FIG. 7 is a cross sectional view of the duck call of FIG. 3 in the assembled position with the various parts shown in section.

FIG. 8 is a side view of the soundbox by itself.

FIG. 9 is an end view of the soundbox of FIG. 8.

FIG. 10 is a top view of the tongue showing the flared groove.

FIG. 11 is a side view of the tongue of FIG. 10.

FIG. 12 is an end view of the tongue of FIGS. 10 and 11.

FIG. 13 is a plan view of the wedge forming a part of the duck call in FIG. 7.

FIG. 14 is an end view of the wedge.

FIG. 15 is a side view of the wedge.

FIG. 16 is a side view of a modified duck call constructed in accordance with the present invention having a mouthpiece that is tapered almost all the way across.

Referring to the drawings, FIG. 1 is a pictorial representation of a bird call 10 being used by a caller 12. The call 10 is shown in a vertical position grasped at its lower end by the right hand of the caller as indicated at 14 so that the hand may be opened and closed to modify the sound coming from the lower end or bottom of the bird call. In order to adequately blow into the call the caller's head is shown as tilted at a substantial angle in the forward direction making it, for all practical purposes, impossible to watch the flight of birds over nearby decoys.

FIG. 2 is a pictorial representation of the same caller 12 using a bird call 20 constructed in accordance with the present invention 20. Again, the call is grasped by the lower end in the right hand of the caller but as is apparent from a comparison of FIGS. 1 and 2, the caller's head in FIG. 2 is much more erect and, in fact, in almost a normal upright position. By glancing upwardly, a hunter when in the position illustrated in FIG. 2, would be able to watch the flight of birds approaching decoys as they would normally be located in front of the hunter when in a duck blind or the like.

FIG. 3 is a side view of the duck call 20 of FIG. 2. It comprises a mouthpiece 22 which is suitably apertured to receive the reduced diameter end portion of a soundbox 24. The mouthpiece is tapered as at 26 more than halfway across and it is into this tapered portion 26 of the mouthpiece end 28 that the caller blows. FIGS. 4, 5 and 6 are side, top and end views respectively of the mouthpiece 22 while FIG. 7 is a cross section through the entire caller 20 and a similar view to that shown in FIG. 3. The mouthpiece is of circular construction with a circular central aperture 30 extending all the way through it. Aperture 30 is enlarged at one end 32 of the mouthpiece as indicated at 34 which enlarged end is adapted to receive the soundbox 24.

The soundbox 24 is also of circular configuration and has a central aperture 36 extending all the way through it. The soundbox has a reduced diameter portion 38 adapted to be received with a friction fit within the enlarged end 34 of the aperture 30 of the mouthpiece. The press or friction fit may, if desired, be facilitated by slightly tapering the reduced end 38 of the soundbox. In any event, the construction is prefereably such that the two pieces are readily separable so that access may be had to the sound producing members for cleaning and adjustment as desired.

Received within the cavity 36 at the reduced end portion 38 of the mouthpiece is one end of a tongue 40. The tongue is shown in FIGS. 10, 11 and 12 and has a rounded underside as indicated at 42 in FIG. 12 adapted to mate with the interior wall surface of the aperture 36 in the soundbox. The tongue is provided with a groove or cavity 44 flared outwardly at the opposite end as indicated at 46 in FIG. 10. Overlying the tongue including the flared cavity 44 is a reed 48 of very thin plastic material which reed extends as indicated at 50 outwardly beyond the tapered end 52 of the tongue such that when air passes through the cavity 30 of the mouthpiece the reed is caused to vibrate. The other end of the reed is tightly clamped between the tongue and a wedge 54 shown in FIGS. 13, 14 and 15. The upper side of the wedge is similarly curved at 56 to mate with the inside wall surface of aperture 36 of the soundbox and has a flat side 58 which cooperates with the corresponding flat side 60 of the end of the tongue to tightly clamp the right hand end of reed 50 as illustrated in FIG. 7. That is, the wedge and right hand end of the tongue, as illustrated in FIG. 7, are tightly wedged into the end of aperture 36 in such a manner that the end of the reed is tightly clamped between them so that the aperture 36 of the soundbox supports the wedge and tongue and they in turn, clamp and tightly hold one end of the reed 50. It is apparent from a consideration of FIG. 7 that by blowing into the tapered end of the mouthpiece in the direction indicated by the arrow 60 the end of the reed is caused to move back and forth away from the tongue, vibrating to produce the desired sound which emanates in the direction of the arrow 62.

FIG. 16 shows a modified embodiment of the call generally indicated at 70. This embodiment is in all respects identical to the previous embodiment, best seen in FIGS. 3 and 7, but is modified to the extent that the taper 72 on the mouthpiece 22' extends well beyond the center line as in the previous embodiment and, in fact, extends substantially across the entire width of the mouthpiece. Either embodiment may be used with equal facility depending upon the particular desires of the bird caller.

It is apparent that the present invention provides an improved bird call and particularly one having a slanted mouthpiece, that is, a mounthpiece with a portion that is slanted at least beyond the center line of the mouthpiece and at an angle of at least approximately 30° to a transverse plane passing through the center line of the bird call. In the preferred embodiment, the angle of the slanted end 26 in FIG. 3 or 72 in FIG. 16, may be varied to intersect a transverse plane at an angle between approximately 30° and 45° and the taper instead of being completely flat may be slightly curved or rounded as preferably are the edges of the mouthpiece for increased comfort. Also incorporated in the device is an improved tongue construction which is flared outwardly at its open end as illustrated at 46 in FIG. 10 to reduce back pressure and the build up of moisture in the call.

While a specific embodiment of the invention has been shown and described in detail, it will be understood that the invention may be modified without departing from the spirit of the inventive principles as set forth in the hereafter appended claims.

What is claimed is:

1. A bird call comprising a mouthpiece with a central aperture, said mouthpiece having a slanted blowing end whereby a caller may hold the bird call in a vertical downward direction during use with minimum downward deflection of the caller's head, a soundbox with a central aperture joined to said mouthpiece, said soundbox supporting a tongue and vibrating reed which projects into said mouthpiece, said tongue including a groove which flares outwardly in a direction away from said mouthpiece.

2. A bird call according to claim 1 wherein said reed is made of flexible plastic and overlies said flared groove.

3. A bird call according to claim 2 wherein said soundbox includes a wedge, said reed having one end clamped between said tongue and said wedge.

4. A bird call according to claim 3 wherein said tongue is tapered downwardly in the direction of said mouthpiece, said reed overlying at least a portion of the tapered end of said tongue whereby said reed is spaced from that portion of the tongue.

5. A bird call according to claim 4 wherein said mouthpiece, soundbox, tongue and wedge are all made of wood.

6. A bird call according to claim 5 wherein said mouthpiece and soundbox are both of circular configuration.

7. A bird call according to claim 6 wherein said mouthpiece and soundbox are removably joined to each other.

8. A bird call according to claim 7 wherein the aperture in said mouthpiece is enlarged at one end, said soundbox including a reduced diameter portion received in the enlarged aperture end of said mouthpiece.

9. A bird call according to claim 8 wherein said mouthpiece and soundbox are joined with a friction fit.

* * * * *